Dec. 5, 1944.  A. E. BRYCE  2,364,266
FASTENER
Filed Sept. 29, 1943
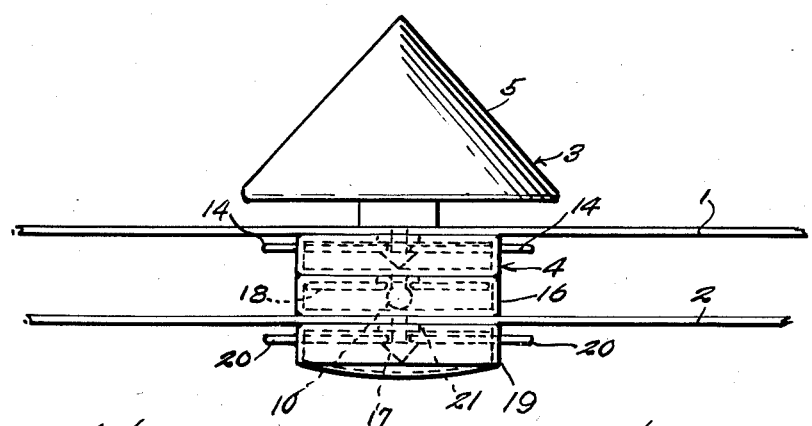
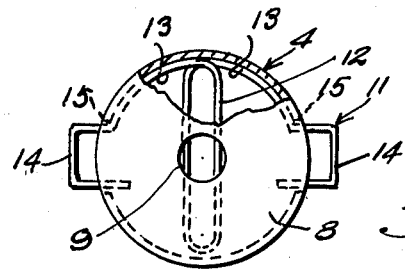
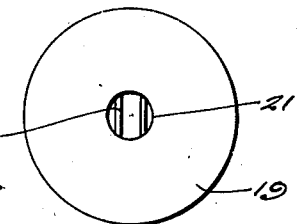
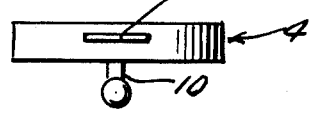
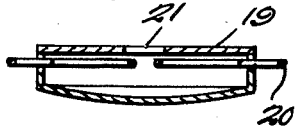
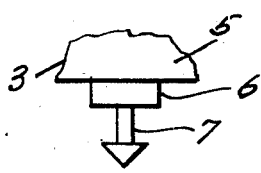
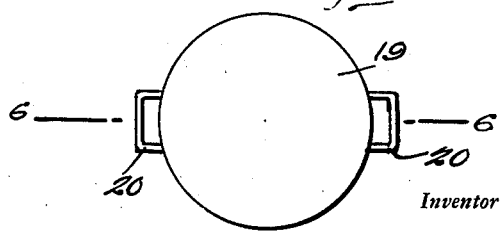
Inventor
ALLAN EDWARD BRYCE
By *Clarence A. O'Brien and Harvey B. Jacobson*
Attorneys Patented Dec. 5, 1944

2,364,266

UNITED STATES PATENT OFFICE 2,364,266

FASTENER

Allan Edward Bryce, Providence, R. I.

Application September 29, 1943, Serial No. 504,309

1 Claim. (Cl. 24—211)

My invention relates to improvements in fasteners of the general type forming the subject matter of my U. S. patents, Nos. 2,288,990, dated July 17, 1942, and 2,323,197, dated June 29, 1943.

The principal object of the instant invention is to adapt pairs of complemental male and female fasteners for use in securing one piece of fabric to another so as to obviate resorting to buttonholes, and for easy, quick attachment to, or detachment from, the fabric.

Other and subordinate objects are also comprehended by my invention, all of which, together with the precise nature of my improvements, will be readily understood when the succeeding description and claim are read with reference to the drawing accompanying and forming part of this specification.

In said drawing:

Figure 1 is a view in side elevation of my improved fastener applied,

Figure 2 is a view in plan, partly broken away, of the combined male and female fastener members of one pair, Figure 3 is a view in side elevation of the same, Figure 4 is a view in plan of the combined male and female fastener members of the other pair, Figure 5 is a similar rear view of the female fastener member of said other pair, Figure 6 is a view in diametrical section taken on the line 6—6 of Figure 5, and Figure 7 is a fragmentary view in side elevation of the male member of the first-mentioned pair.

Referring to the drawing by numerals, my improved fastener has been shown therein as applied to two pieces of fabric 1, 2, the piece 1 to be fastened to the piece 2 over the same.

According to my invention, the piece of fabric 1 is provided with a pair of fastener members opposed to opposite sides thereof and having the form of a male fastener member and a combined male and female fastener member 4. The fastener member 3 comprises preferably a dummy button, or the like, 5 having a shank 6 opposed to one side of the piece of fabric 1 and provided with an axial headed stud 7 of conical shape piercing the piece of fabric 1, as shown in Figure 1 in dotted lines. The combined male and female fastener member 4 comprises a flat, circular shell 8 one side of which is formed with an axial aperture 9 through which the stud 7 extends into the shell 8. The other side of the shell 8 is provided with an axial, round-headed stud 10. The shell 8 embodies a spring catch 11 for releasably locking to the stud 7 behind the head of the stud with a snap action. The spring catch 11 is formed from a single piece of resilient wire bent upon itself to provide a straight-sided loop 12 disposed diametrically in the shell 8, a pair of arcuate stretches 13 extending oppositely from one end of the loop 12 to fit against the side of the shell 8 and which are crossed at said end of said loop and terminate in outwardly offset, right angled ends 14 at diametrically opposite sides of said shell 8, respectively, extending out of said shell through a pair of circumferential slots 15 provided in the shell. As will be seen, by squeezing the ends 14 of the catch 11 together, the sides of the loop 12 will be separated to permit withdrawal of the stud 7 out of the loop 12 and said shell 8.

The piece of fabric 2 is provided on one side thereof with a combined male and female fastener member 16 identical with the fastener member 4, with the exception presently noted, and which receives the stud 10 of the fastener member 4, the stud 17 of said member 16 piercing the piece of fabric 2. The fastener member 16 may be provided for snap action engagement with the stud 10 with the usual glove fastener-type catch represented by dotted lines at 18 in Figure 1 and providing for pulling apart of the fastener members 4 and 16. On the other side of the piece of fabric 2 is a female fastener member 19 identical with the fastener member 4 in that it is equipped with a catch 20 and aperture 21 similar to catch 11 and aperture 9 and for locking to the stud 17.

As will now be seen, the pairs of fastener members 3, 4 and 16, 19 may be secured to the pieces of fabric 1, 2 permanently, or not, as desired, and the pairs of fasteners secured together for pulling apart without detaching the members of either pair from the fabric. Also, a button is provided for use as occasion may require.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A fastener for attaching two pieces of fabric together comprising a pair of complemental fastener members for each piece of fabric disposed upon opposite sides of the piece, respectively, each pair including a combined male and female fastener member, said combined members being provided with pull-apart connections for securing the same together in opposed relation relatively separable by pull exerted on the same axially thereof, one member of each pair including a fabric piercing stud and the other member of each pair including a releasable spring catch for snap action engagement with the stud and having ends extending out of the member for squeezing together to release the catch.

ALLAN EDWARD BRYCE.